United States Patent
Sherrets et al.

(10) Patent No.: US 9,635,400 B1
(45) Date of Patent: Apr. 25, 2017

(54) SUBSCRIBING TO VIDEO CLIPS BY SOURCE

(71) Applicant: Google Inc., Mountain View, CA (US)

(72) Inventors: Doug Sherrets, San Francisco, CA (US); Sean Liu, Sunnyvale, CA (US); Brett Rolston Lider, San Francisco, CA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 13/633,042

(22) Filed: Oct. 1, 2012

(51) Int. Cl.
| | |
|---|---|
| *H04N 7/10* | (2006.01) |
| *H04N 7/025* | (2006.01) |
| *G06F 3/00* | (2006.01) |
| *G06F 13/00* | (2006.01) |
| *H04N 5/445* | (2011.01) |
| *H04N 21/25* | (2011.01) |
| *H04N 21/482* | (2011.01) |

(52) U.S. Cl.
CPC ......... *H04N 21/25* (2013.01); *H04N 21/4826* (2013.01)

(58) Field of Classification Search
CPC .... H04N 21/25; H04N 21/251; H04N 21/466; H04N 21/4668; H04N 21/4826

USPC ................ 725/32, 34, 35, 37, 40, 41, 43–46
See application file for complete search history.

(56) References Cited

U.S. PATENT DOCUMENTS

| | | | |
|---|---|---|---|
| 2010/0199295 A1* | 8/2010 | Katpelly et al. ................ 725/14 |
| 2013/0111512 A1* | 5/2013 | Scellato et al. ................ 725/14 |
| 2013/0268620 A1* | 10/2013 | Osminer ....................... 709/217 |
| 2013/0326573 A1* | 12/2013 | Sharon .................. H04H 60/59 725/115 |
| 2013/0343598 A1* | 12/2013 | Kocks et al. ................. 382/100 |
| 2016/0100031 A1* | 4/2016 | Wood .................... H04L 67/101 709/203 |

* cited by examiner

*Primary Examiner* — Kyu Chae
(74) *Attorney, Agent, or Firm* — Fenwick & West LLP

(57) ABSTRACT

A video hosting service receives videos uploaded from users and associates the uploaded videos with a set of source content videos. The source content is used to identify the source of portions of video used in the uploaded videos. The source allows a user to view the source from which a portion of a video came from. By identifying the source, the video hosting service can provide additional videos that include different portions of the same source, different sources related to the source, and different videos that use or describe the same portion of the source.

22 Claims, 5 Drawing Sheets

Source View
500

Stream View
510

Uploader View
520

SUBSCRIBING TO VIDEO CLIPS BY SOURCE

BACKGROUND

1. Field of Art

The present disclosure generally relates to user selection of videos and particularly to selection and subscription of videos based on the source of the video.

2. Background

Video hosting services provide users the ability to view videos uploaded by content providers. Videos may include original content recorded by the individual users, and may also include portions of video taken from other sources. A source video contains a video clip that is used in another video. For example, a highlight from a recording of a particular basketball game may be included in a highlight video made by the owner of the video or within a fan-made highlight video, the upload of which is authorized by the owner of the course video. For users who view the highlight clip included in these videos, there is no convenient way to identify or view the recording of the full basketball game.

SUMMARY

A video hosting service associates one of more videos containing a clip with a set of source content videos. The source content is used to identify the source of portions of video used in the uploaded videos. Identification of the source allows a user to view the source from which a portion of a video came. By identifying the source, the video hosting service can provide additional videos that include different portions of the same source, different sources related to the source, and different videos that use or describe the same portion of the source. The video hosting service can also provide an additional source of revenue for the owner of the source when it sends additional viewers to the source (even if the source owner is also monetizing the video containing the clip).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

Figure 1:
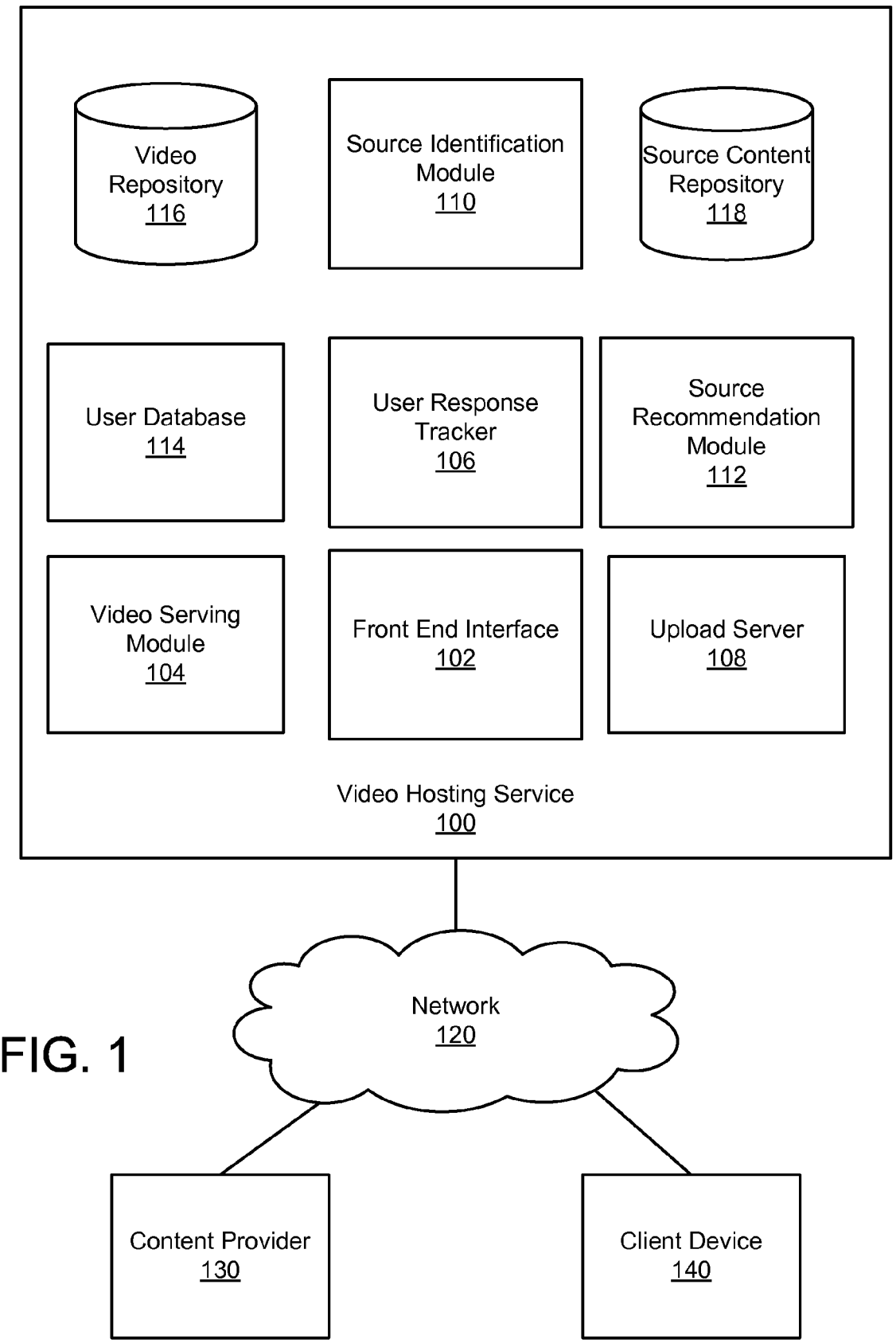
FIG. 1 is a block diagram of a video hosting service 100 in which users can select videos to view based on the video source according to one embodiment.

FIG. 1 is a block diagram of a video hosting service 100 in which users can select videos to view based on the video source to one embodiment. The video hosting service 100 represents a system such as that of YOUTUBE™ or GOOGLE VIDEOS™ that stores and provides videos to clients such as the client device 140. The video hosting site 100 communicates with a plurality of content providers 130 and client devices 140 via a network 120 to facilitate sharing of video content between users. The video hosting service 100 additionally includes a front end interface 102, a video serving module 104, a user response tracker, an upload server 108, a source identification module 110, a source recommendation module 112, a user database 114, a video repository 116, and a source content repository 118. Other conventional features, such as firewalls, load balancers, authentication servers, application servers, failover servers, site management tools, and so forth are not shown so as to more clearly illustrate the features of the video hosting site 100. One example of a suitable site 100 is the YOUTUBE™ website, found at www.youtube.com. Other video hosting sites can be adapted to operate according to the teachings disclosed herein. The illustrated components of the video hosting website 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more client devices 140 in other embodiments if appropriate.

Client devices 140 are computing devices that execute client software, e.g., a web browser or built-in client application, to connect to the front end interface 102 of the video hosting service 100 via a network 120 and to display videos. The client device 140 might be, for example, a personal computer, a personal digital assistant, a cellular, mobile, or smart phone, or a laptop computer, digital television, digital set-top box, or the like.

The network 120 is typically the Internet, but may be any network, including but not limited to a LAN, a MAN, a WAN, a mobile wired or wireless network, a private network, or a virtual private network.

The content provider 130 provides video content to the video hosting service 100, which in turns stores the video content, and the client 140 views that content, typically receiving the video content in streaming format. In practice, a content provider may also be a content viewer (e.g., viewers who generate content and upload it to the video hosting service 100). Additionally, a content provider 130 may be the same entity that operates the video hosting site 100.

A content provider 130 operates a computer system configured to perform various content provider functions; the computer system may be operated by a client 140 as well. Content provider functions may include, for example, uploading a video file to the video hosting website 100, editing a video file stored by the video hosting website 100, or editing content provider preferences associated with a video file. The video hosting website 100 exposes various application programming interfaces, as well as client tools (e.g., Java or HTML5 based video editor), to support this functionality.

A client 140 is used to view video content stored by the video hosting site 100. Clients 140 may also be used to configure viewer preferences related to video content, accessing these preferences on the video hosting website 100 through provided user interfaces. In some embodiments, the client 140 includes an embedded video player such as, for example, the FLASH player from Adobe Systems, Inc. or any other player adapted for the video file formats used in the video hosting website 100. Note that the terms "client" and "content provider" as used herein refer the particular apparatus resulting from the execution of software (providing respective client and content functionality) by general purpose hardware on which the software executes.

The user response tracker 106 receives and records user interactions with videos in the video repository. As users start videos, stop videos, and transition from one video to another, the user response tracker 106 records these user activities. In particular, the user response tracker 106 identifies portions of videos that users are most likely to view, for example by determining when users start videos, such as starting a particular video at time code 0:12, and when users stop videos, such as ending viewing of a particular video at time code at 2:42. These most-often viewed portions are identified as highlights of a video, and may indicate portions that users find most interesting. Highlights may also be based on the number of views, shares, comments, and other statistics for the video across the hosting service 100. These various statistics may be aggregated to indicate a watch rate for a video. The watch rate includes portions of the video watched and which portion of the video tends to have higher drop-off rates. A sufficiently high watch rate may be used to indicate a highlight of a video. Comments and user sharing of the video may also be associated with particular portions of a video and used to identify the video's highlights. These user responses may be stored with the videos in the video repository or may be separately stored with the user response tracker 106.

Highlights may also be determined across many video clips by determining which videos are most frequently watched or which portions of those videos are most popular. For example, a user may select video clips related to a single topic or source (e.g., by executing a search), and the system may determine which portions of video from among those clips are the highest qualifiers for a highlight. Highlights may also be generated for particular source content or for relationships across source content. As such, highlights may apply to content across sources, such as a particular show, an actor, a character, a setting, user annotations, and other methods of identifying similar content in a video.

The upload server 108 of the video hosting service 100 receives video content from a client device 140 or a content provider 130. Received content is stored in the video repository 116. In response to requests from a client 140, a video serving module 104 provides video data from the video repository 116 to the client. Clients 140 may also search for videos of interest stored in the video repository 116 such as by entering textual queries containing keywords of interest. Front end interface 102 provides the interface between client 140 and the various components of the video hosting site 100.

In some embodiments, the user database 114 is responsible for maintaining a record of registered users of the video hosting server 100. Registered users include content providers 130 as well as users who simply view videos on the video hosting website 100. Each content provider 130 and/or individual user registers account information including login name, electronic mail (e-mail) address and password with the video hosting server 100, and is provided with a unique user ID. This account information is stored in the user database 114. In one embodiment, the user account also includes privacy settings associated with the user account. The privacy settings allow a user to control the amount of data retained by the system about the user, such as the user's video viewing history and other actions performed by the user on the video repository. The privacy settings allow the user to enable or disable data collection by the video hosting website 100.

The video repository 116 contains a set of videos submitted by content providers and other users. The video repository 116 can contain any number of videos, such as tens of thousands or hundreds of millions. Each of the videos has a unique video identifier that distinguishes it from each of the other videos, such as a textual name (e.g., the string "a91qrx8"), an integer, or any other way of uniquely naming a video. The videos can be packaged in various containers such as AVI, MP4, or MOV, and can be encoded using video codecs such as MPEG-2, MPEG-4, WebM, WMV, H.263, and the like. In addition to their audiovisual content, the videos further have associated metadata. For example, the videos may include metadata such as textual metadata such as a title, a description, and tags describing various aspects of the videos. Such tags may indicate, for example, that the video is associated with a particular series, an episode of a television series, includes certain actors, contains sports coverage of a particular team or player, and any other information about a video in the video repository.

The source content repository 118 stores identified source content for videos. The source content for videos is a repository for original source material for videos. For example, an original movie, a broadcast of a sporting event, broadcast television shows, and other types of material are added to the source content repository 118 as source material. The source content repository 118 is typically populated by content providers 130 who indicate they are the rights holder of the source content. For example, a content owner may provide the video hosting service 100 with all of the broadcast episodes of a particular television program, or provide a catalog of movies owned by the content owner to the video hosting service 100. The content provided to the source content repository 118 may also be provided individually as content is created. For example a studio that completes a new film may provide the source content to the video hosting service 100 as the film is completed. This source content is stored in the source content repository 118. The source content may also be stored with a variety of tags and other data describing the source content. Such tags may describe the origin of the source content, persons in the video, locations of the video, a producer, a title, and other data describing the source content according to the type of source content. For example, a television series may include the series name, the season, the episode, the title, writers and directors of the episode, actors in the episode, any cameo appearances, and topics of the episode. The source content may or may not be available as videos in the video repository 116 for users to view. The video hosting service 100 may use the source content repository for a variety of purposes. For example, a content owner may request the video hosting service 100 prevent users from uploading videos to the video repository 116 that match the source content.

The source identification module 110 determines whether videos in the video repository 116 and new videos uploaded by content providers 130 match any source content in the source content repository 118. Many videos uploaded to the video repository 116 may comprise portions of source content 118. For example, a user may compile portions of videos illustrating sports highlights from a variety of different sports into a single video and upload that video to the video repository. The sports highlights occurred within source content of the full sporting event. As described below with respect to FIG. 2, the source identification module 110 identifies the portions of a video that correspond to various sources in the source content repository 118. To identify the sources in a video, the source identification module 110 may calculate a fingerprint or other unique representation of the source content and the videos in the video repository. The fingerprint may be calculated based on a series of frames in the videos and may be determined based on a rolling window of frames in the video. For example, the fingerprint may be based on a rolling window of 200 frames for each video and the source. The fingerprint may be based on frame features as well as motion features from one from to the next. Videos uploaded to the video hosting service 100 are analyzed by the source identification module 110 to identify the sources used in the video. For videos that are determined to contain clips from a source video, a determination is made that authorization from a right holder is required and such authorization is obtained before the video is added to the repository. If a required authorization cannot be obtained from the right holder, the video is not added to the repository. An indication of the identified sources is stored with the video in the video repository 116.

The source recommendation module 112 interacts with the front end interface 102 and user database 114 to recommend videos to users based on the sources identified in videos being watched or previously watched by users. As users watch videos, the identified sources in the video are provided to the user to allow users to watch additional material from the source in the video or to recommend and select videos that may also be of interest to the user based on the source in the video being watched. As such, as the viewer watches a video, the source recommendation module 112 provides videos in the video repository 116 that are also associated with the source or sources identified in the video being watched. The source recommendation module 112 identifies videos that use the same source, for example a video that provides video prior to or after the portion of the source in the video being watched. The source recommendation module 112 may also identify videos related to the source based on the metadata associated with the sources. For example, if a user is watching a video relating to a television show, the source recommendation module 112 may identify additional source content for other episodes or seasons of the television show and videos in the video repository 116 that include the related source content. The source recommendation module 112 may also account for user responses obtained by the user response tracker 106. For example, the source recommendation module 112 may only recommend videos that are popular or to recommend portions of a source that are popular. A user watching a basketball highlight whose source content is the entire basketball game may be interested in an authorized highly watched video (or a highly watched portion) that is also from that basketball game.

In addition, the source recommendation module 112 allows users to subscribe to particular sources or types of source content. For example, a user may be interested in watching videos related to a particular sports team and wants to subscribe to highlights in new, authorized videos. The user's subscription is stored in the user database 114. As new, authorized videos are added to the video repository 116 and the source identification module 110 determines the source content of the new video, the source recommendation module 112 receives a notification of the new video and determines whether the new video and identified source content are relevant to a user's subscription. When a new video includes source content relevant to the user's subscription, video hosting service 100 places the video in a subscription queue for the user in the user database 114.

Figure 2:
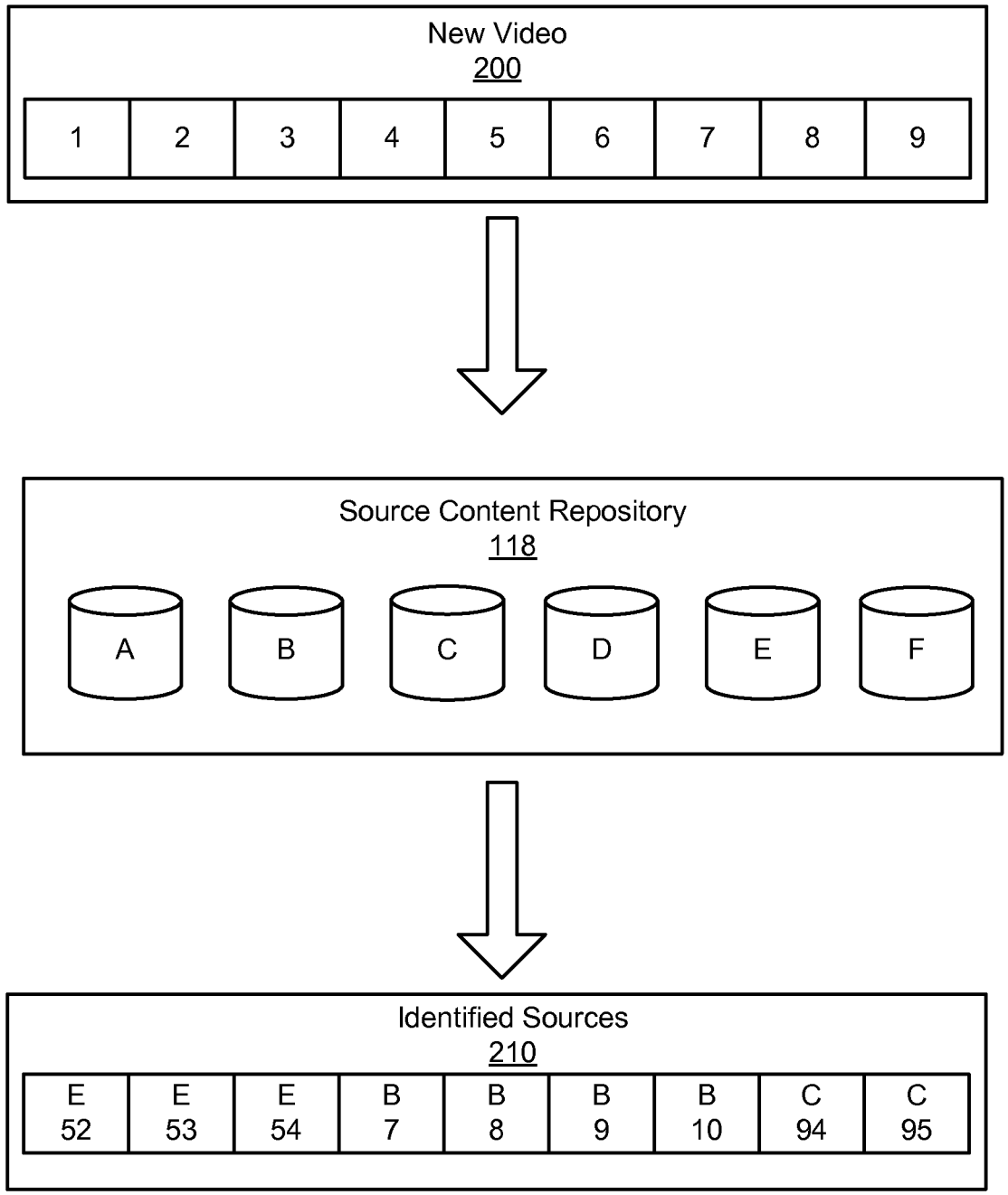
FIG. 2 illustrates the identification of source content in a new video 200 uploaded to the video hosting service 100 according to one embodiment.

FIG. 2 illustrates the identification of source content in a new video 200 uploaded to the video hosting service 100 according to one embodiment. The new video 200 is received by the video hosting service 100. As shown, the new video 200 comprises a series of sequential frames. Though shown here conceptually as a series of 9 frames, in practice the video 200 may have any number of portions to be analyzed by the source identification module 110. Though described as just nine frames in this example, any number of frames (typically in the hundreds or thousands) may be in an uploaded video. The source identification module 110 analyzes the new video 200 to identify various fingerprints within the video 200. The fingerprints identified in the new video are compared against the source content repository 118 to identify the source content present in the video 200. In this example, the source identification module 110 identifies sources 210 in the new video from source content E, B, and C. The source identification module 110 identifies the first portion of the new video 200 as being frames 52-54 of source E, the middle portion as frames 7-10 of source B, and the end portion as frames 94 and 95 of source C.

Figure 3:
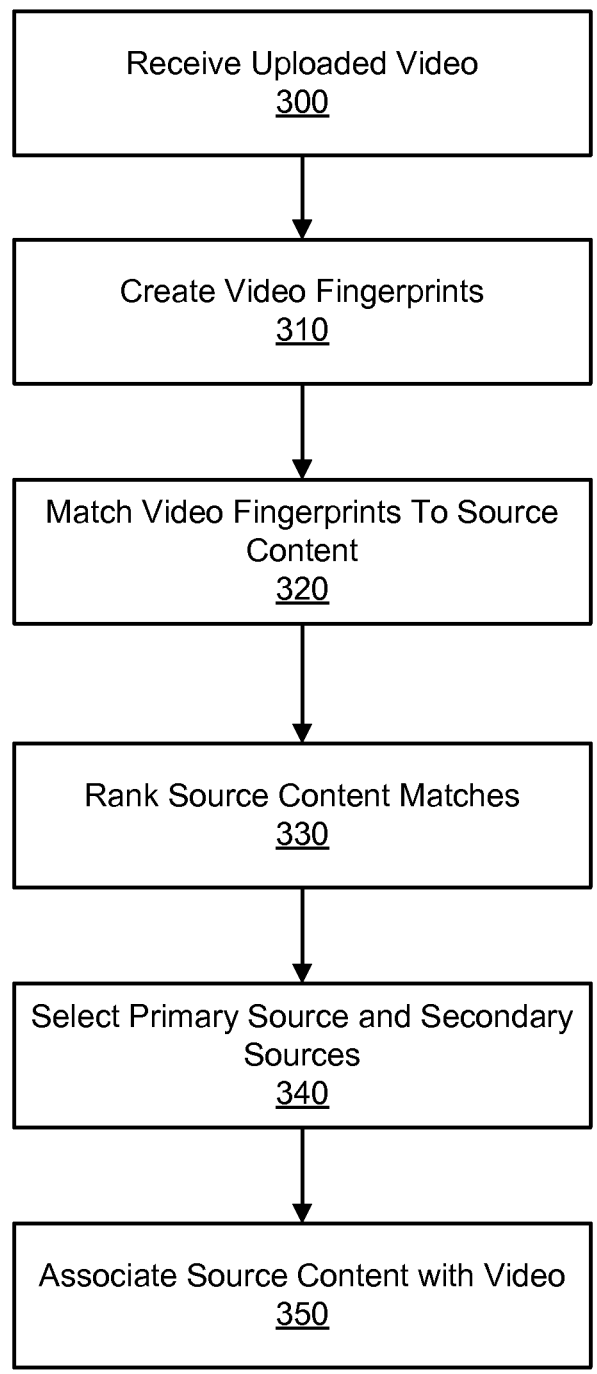
FIG. 3 is a flowchart illustrating the identification of source content in an uploaded video performed by a source identification module 110 according to one embodiment.

FIG. 3 is a flowchart illustrating the identification of source content in an uploaded video performed by a source identification module 110 according to one embodiment. The source identification module 110 receives an uploaded video 300. Next, fingerprints are created 310 for the uploaded video that describe the video contents. The fingerprints from the uploaded video are matched 320 to the source content fingerprints to identify matches of the video to the source content. Depending on the source content in the source context database, the video may find several matches to the fingerprint for a particular portion of the video. A video may also have no matches for the fingerprint. When there are several matches to the fingerprint, the source identification module 110 attempts to identify source content as the primary source content by ranking 330 the source content matches. Several matches to the fingerprint may occur, for example, when the same clip appears in several sources, e.g., a sports highlight appears in the original sports broadcast and in a sports highlight program. Both the sports broadcast and the sports highlight program may be provided to the source content repository 118. When there are no source content matches, the source identification module 110 may associate no source content with the portion of video or may create a new source content entry comprising the video portion. For videos that are determined to contain clips from a source video, a determination is made that authorization from a right holder is required and such authorization is obtained before the video is added to the repository. If a required authorization cannot be obtained from the right holder, the video is not added to the repository.

In one embodiment, to rank 330 the source content matches, the source content matching the video portion are ranked according to the quality of the source content and the reputation of the uploader of the source content. To determine quality of the source content, the source content identification module 110 assesses metrics of the source videos, such as the average popularity of videos that are associated with the source, the resolution, the focus, and other aspects of the video clip. In some circumstances, a source video may expressly disclaim portions of the source video as being derivatives of another source. This disclaimer may be indicated by the provider of the source video and the source video may be annotated to indicate the portions that are derivative by associating start and stop times for the derivative portions. For example, the source video for a sports highlight program may be annotated to indicate that the commentary on highlights are source content but that the portions of the video that show sports highlight from the sporting event are derivative of a sporting event broadcast. After ranking the source content matches, the highest ranked match is selected 340 as the primary source and the remaining sources are the secondary sources for the uploaded video. Finally the selected source content is associated 350 with the video.

Figure 4:
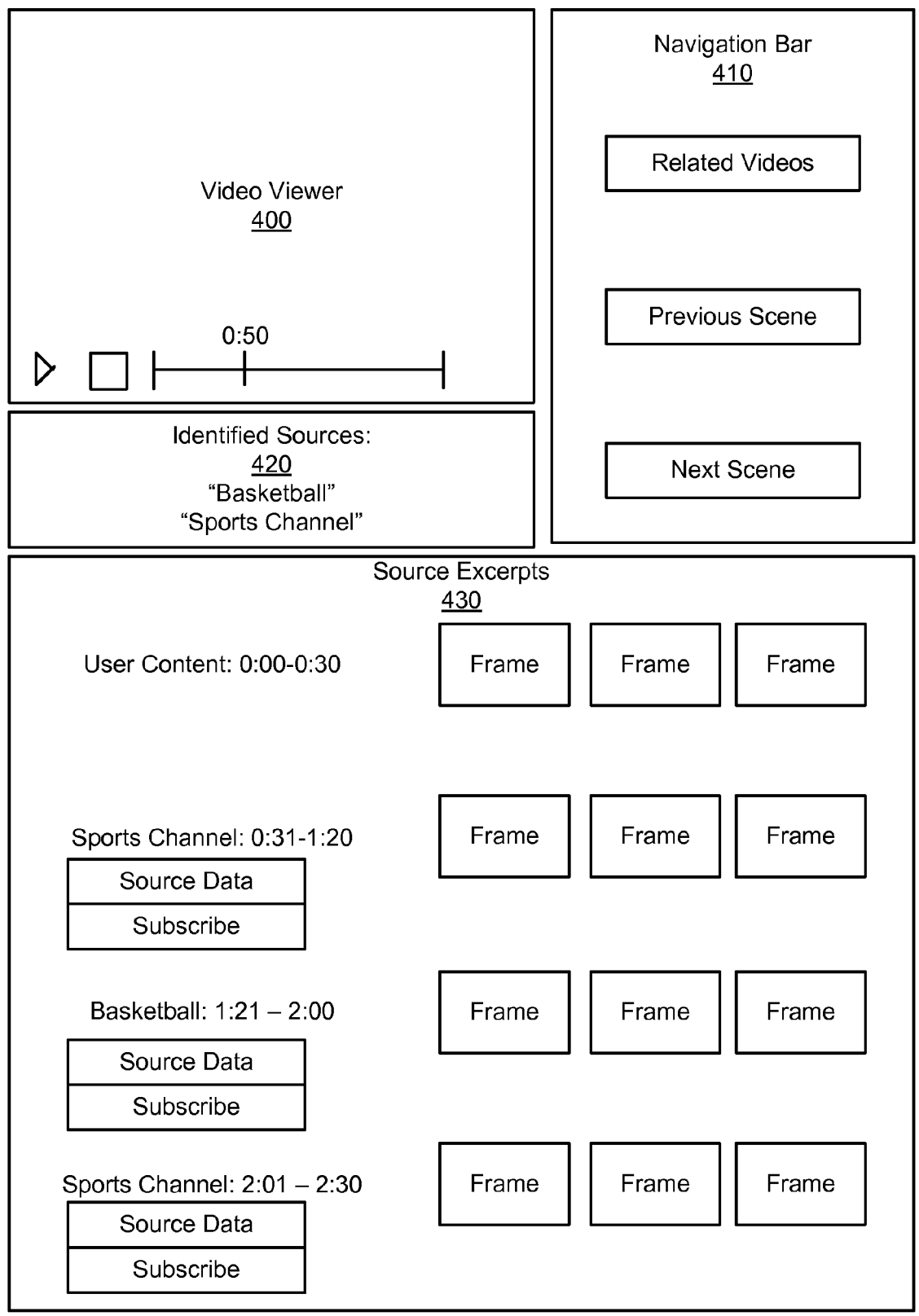
FIG. 4 illustrates a user interface providing source-related information to a user for a video according to one embodiment.

FIG. 4 illustrates a user interface providing source-related information to a user for a video according to one embodiment. The user interface provides various types of information to the user related to the source or sources associated with the video being viewed. The user interface includes a video viewer 400, a navigation pane 410, an identified sources pane 420, and may include a pane describing source excerpts 430. The video viewer 400 provides an interface for the user to view and control viewing of the user's video. The video viewer 400 allows the user to start, stop, select a location in the video to begin play, and other traditional video viewing activities. The navigation bar 410 provides the user with additional options for videos to view after viewing the video. The navigation bar 410 provides the user with related videos, and, when available, an option to view previous and next scenes related to source content in the video being viewed. Related videos may be selected, for example, by selecting videos that have a high correlation of viewer watches and interest with the viewed video. As the user views the video, the user may be shown the several sources identified in the video. As the video plays a particular source, the previous and next scene identify the source being played at the moment by the video player 400, and illustrate videos providing source material previous to and ahead of the scene. For example, if the video player at time 0:50 is associated with source E at time 7:42, the previous scene displays videos showing source E at times prior to 7:42, and the next scene displays videos showing source E at times after 7:42. The previous and next scene interfaces may also be responsive to the portion of the video the user is watching. As the video moves from one source association to another, the previous and next scene interfaces may also change to show previous and next content associated with the actual source being played.

The identified sources pane 420 displays a list of the identified sources in the video being watched by the user. The identified sources pane 420 provides an interface for the user to investigate sources contained in the video and additional videos related to the sources. In one embodiment, the source excerpts pane 430 is a pop-up that appears when a user hovers over the identified sources pane 420. The source excerpts pane 430 provides the user with a detailed view of the sources present in the video. For example, in this video three sources are identified, user content, a sports channel, and a basketball game. The source excerpts pane 430 provides the user with information about the location in the video that each source appears and may include the amount of time for each source. In this example, the source identification module 110 identified sources for the sports channel and basketball, but did not identify a source for the first thirty seconds of the video. This first thirty seconds is identified as "user content" in this embodiment, though other descriptions may be used. In other embodiments, the unidentified portions of content are not displayed in the source excerpts pane 430.

Along with the identified sources, the source excerpts pane 430 provides frames from the video illustrating the portions of video associated with each source. This allows the user to quickly and easily identify portions of the video of each source and browse the video quickly according to each of the source content in the video. In addition, each source may provide additional source data and allow users to subscribe to the source. The source data may provide information stored with the source content repository, such as the title and other information related to the source content. The user may also interact with the source excerpt to access an interface dedicated to that source.

Figure 5:
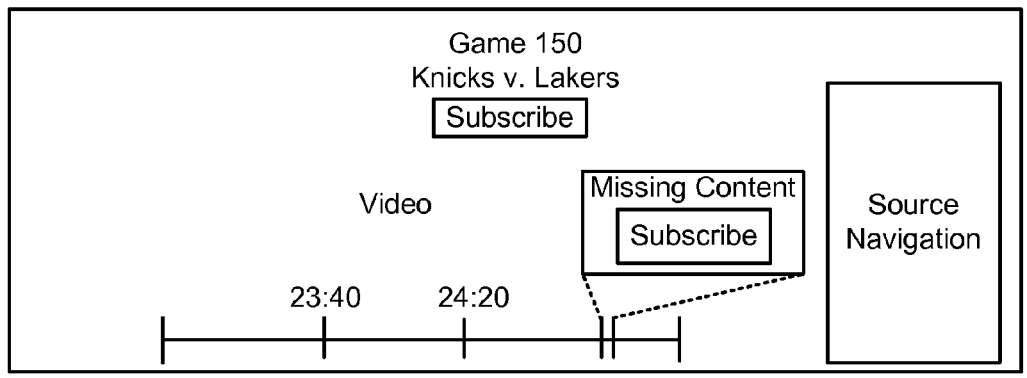
FIG. 5 illustrates interfaces for viewing videos related to a particular source according to one embodiment.
Figure 5:
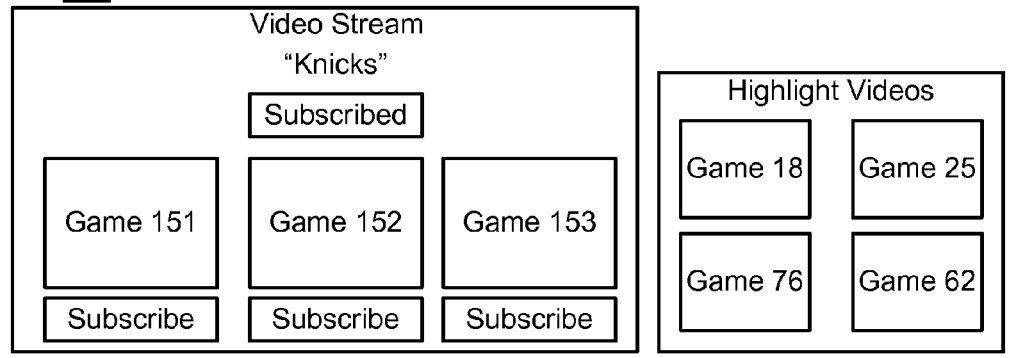
Figure 5:
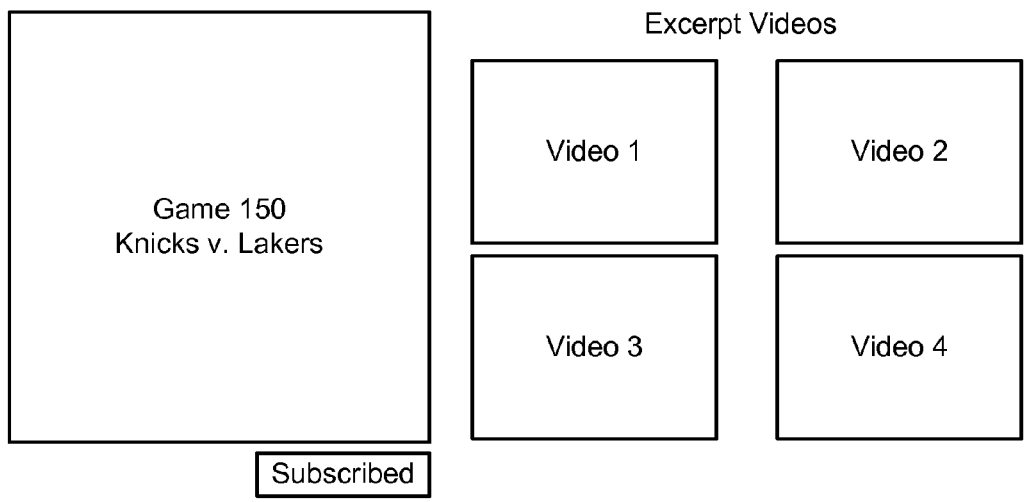

FIG. 5 illustrates interfaces for viewing videos related to a particular source according to one embodiment. These interfaces related to particular video sources include a source view 500, a stream view 510, and an uploader view 520. Users may interface with each of these views on a single user interface, or users may individually access each view. In the examples shown in FIG. 5, a user has accessed the source interface from the video shown in FIG. 4 by selecting the basketball source displayed in the source excerpts pane 430.

The source view 500 provides the user an illustration of the position of the viewed video in the context of the source as a chronological whole. That is, the user viewing the basketball excerpt for 40 seconds in FIG. 4 is shown the basketball excerpt is from game 150 of a Knicks v. Lakers game, and the excerpt is from the time period 23:40 to 24:20. The user can navigate the source view 400 to identify portions of the source content that the user would be interested in watching. For example, the user may select a timeframe in the video from 19:00 to 24:20 to view the portion of the game leading up to the portion of the source in the video the user watched. The source recommendation module 112 queries the source content repository 118 and video repository 116 to identify videos that include source material for the timeframe requested by the user that occur chronologically prior to the portion viewed. Likewise, a user may select a video that occurs chronologically after the portion viewed. In some embodiments, the source material is not available in a single video for the whole timeframe requested by the user, though the source material may be available if the user views more than one video. In this case, the interface allows the user to queue the videos that provide the requested timeframe such that the user may automatically view the desired timeframe. As the user selects various timeframes in the source video, a source navigation tab allows the user to view various videos provided the desired timeframe of the source shown to the user. By using the source view 500 to enable a user to interface with videos associated with the same source, the user is able to identify and select portions of the source that would otherwise be difficult to find by searching the video repository by keyword or other means. The user can subscribe to updates from the source. The subscription may be to particular types of updates, such as a video qualifying as a highlight, or a video that has been uploaded that provides a portion of the source that was not previously available.

The stream view 510 allows a user to view videos showing source content for sources related to the source the viewer has selected. This allows a user to intelligently view related source material, and is helpful, for example, for source material such as television shows or sports that offer a number of sequential events. Using the data associated with the source content, the source recommendation module 112 identifies related and sequential sources to display to the user, even if the videos displaying the source has been uploaded by a variety of different users. The stream view 510 provides a video stream of related content and may also show related highlights from past videos. In this example, the video stream may show past and future basketball games, such as games played by the Knicks before and after game 150. The video stream may also be scrollable by the user to display additional videos. Selecting a video in the video stream 510 may provide the user with the source view 500 for that video. The user may see updates in the stream view based on the subscription "Knicks," which depending on the subscription type can include new content available from particular games, and highlights of new or existing content based on user activity. In this case, highlights are shown from new games based on a subscription to know about new Knicks games. In other cases such as subscribing to any new Knicks content, videos could appear for video excerpts of any prior Knicks games. The "Subscribed" button next to "Knicks" indicates that the user has subscribed, and the user can select the button to modify the subscription as needed.

The video stream may also account for upcoming or past content that is not yet available or associated with any videos uploaded by users. For example, the sports broadcaster may indicate to the video hosting service 100 that there are 160 games involving the Knicks this season, and the source content repository may include placeholders for these games in the video stream. The placeholders may indicate, for example, the source content (and a video associated with the content) does not exist yet but may be anticipated around the time of the game. The video stream may also allow a user to subscribe to the future video and indicate the user wishes a video matching the source be placed on the user's playlist when it becomes available. The video stream also allows users to view past games and identify content for previous games. For example, game 147 may have no uploaded videos corresponding to the source content for game 147. The user may request a notification or subscription when a video is uploaded providing that source content.

The highlight videos identify videos associated with source content of the Knicks based on user interactions that indicate a good user experience. For example the user response tracker 106 may identify portions of various games that are watched and re-watched by many users. Since these videos are associated with sources indicating association with Knicks games, the source recommendation module 112 can identify these videos as Knicks highlights and display the videos in the highlights area. For videos that are determined to contain clips from a source video, a determination is made that authorization from a right holder is required and such authorization is obtained before the video is added to the repository. If a required authorization cannot be obtained from the right holder, the video is not added to the repository. The highlights are also used to determine whether to notify a user of a particular video, rather than notifying the user of any video meeting the subscription. The user may be provided an interface to increase or decrease the sensitivity of the user to the level of popularity for the video. At a high sensitivity, the user may be interested in the video even if it hasn't received many views or other indications of user interest, while at a low sensitivity, the user is not provided the video until it has received a high amount of interest. This allows a user to control the number of videos provided after subscribing to a source.

The uploader view 520 allows the user to identify and interact with various authorized videos uploaded by different users (and different videos) that have provided uploads of the source content. For example, portions of the Knicks v. Lakers source content may be included in a variety of different videos. The videos may be selected for inclusion in the uploader view 520 according to the popularity and variety of types of videos that cite the source content. The uploader view 520 allows the user to view videos provided by different users, which may include different material, a different quality of film, different commentary, and other aspects relating to the source material. For example, a particular sports highlight may be covered by several different sports coverage programs. Each different sports coverage program can be identified in the uploader view 520 and enables the user to compare and contrast coverage by the various sports programs.

Using the various views of the source content shown in FIG. 5, users are able to view source content in context with other portions of the source in the source view 500, alongside videos providing similar source content using the stream view 510, and can identify videos providing different views of the same source content using the uploader view 520. As another example, consider a video excerpt from a political speech by a politician used in a nightly news broadcast. Using the source view 500, the user can identify videos providing context for the video excerpt by finding videos that show segments of the political speech before and after the video excerpt. Using the stream view, the user can identify other political speeches made by the politician, including frequently cited excerpts and allowing subscription to upcoming or past speeches. Using the uploader view 520, the user can identify the use of the excerpt in other videos, for example to view how other news channels are framing and interpreting the excerpt, and to see how other video uploaders are commenting on the video excerpt. Thus, these views allow a user to quickly and easily gain additional information about a portion of a video by associating the video and other videos to sources that can be related to one another. This technique also provides the user with related content without the need to conduct any further searching by the user. The video excerpts can be identified with the primary source of the video, as well as match across multiple primary sources, such as in the case of multiple camera angles, and an identification that all cameras from different primary sources match a particular location, time, event, person, and content. Content can comprise audio or particular words spoken. Words spoken are matched as part of an algorithm to identify that given video clips are part of the same event, with exceptions including that the same words were spoken but at different events based on the events being identified and identifying different times when the given videos were recorded. For example, two different sources might have someone saying the same words and using the date and time of a recording indicate which of the sources to match with the recording. In another example, two sources recording the same basketball game may be in different languages, but it may be known that both games were recorded at the same time and certain player names might be repeatedly spoken in both videos.

The identification of videos with a source enables the system to provide users with subscriptions to sources and the videos providing related source material. Subscription to a source may be manual using the "subscribe" feature as described above, or a subscription may be determined automatically based on a user's viewing activity. In addition, subscription content, e.g., a new video that includes highlights for a source, may be played automatically when they use next accesses the video hosting service.

Content owners may also use the source identification to specify actions to take when a user requests to view a video corresponding to a source owned by the content owner. For example, content owners are able to specify permitted actions before showing a video associated with a source owned by the content owner. For example, the content owner may request the user be shown an advertisement, prompted for payment, or require a user to wait before watching the video. These decisions may be based on the amount of time watching the source by the user or a plurality of users, the amount of a source watched, and the amount of a source watched in order and on other factors. Payment by the user exempts the user from these requirements for a period of time. For example users may be limited in viewing videos associated with chronological portions of a source. In this example, a user is allowed to watch up to 20 chronological minutes of videos associated with a source chronologically from various video sources, but allowed to watch any amount of videos that show the source content in a non-chronological way. A first video may be associated with the first 15 minutes of a source video and a second video associated with the second 15 minutes of the source video subsequent to the first 15 minutes. If a user views the first video and watches the portions of the second video associated with the second 15 minutes, the user is stopped from watching more than the first five minutes. This may reduce the user's ability to view all of the source content without purchasing the source content while allowing users to view parts of the source content.

Users may also use the subscription to identify higher quality videos of a source that was watched in a video. For example the user may watch a sports clip from the 1950s of a famous baseball play, but the sports clip may be of a very low quality and the user can indicate the user is interested in subscribing to the sports clip when a high quality version becomes available. When the high quality version becomes available, the user may be notified based on the user's subscription.

Content owners may use the source identification to manage the way users watch sources owned by the content owner. The amount of time a user watches videos associated with the source of the content owner is tracked. As a user watches an amount of the video associated with the content owner, the system may take various actions, such as capping the amount viewed per day, providing advertising after watching the videos more than a threshold, establish a period of time exempt from the threshold, prompt the user to purchase the source after watching a portion of the source or related source content owned by the content owner, and other actions.

A user subscribed to a source may designate a subscription to portions of the source that are not yet available in any videos. The user is notified when a video is uploaded that is associated with a portion that was not available. When viewing the video that includes the missing content, the system may use the relationship of the missing content with the source to identify the scenes chronologically before and after the originally missing source scenes to provide the user context in viewing the previously missing content.

In some instances, videos may become available and subsequently unavailable to a user. When this occurs, the user may lose access to the portion of the source content that was provided by the video. The user may use a subscription to the source content in order to be informed when the source content becomes available in a video again.

Using the source content and the highlights identified through user interaction, users may use the subscription in order to be informed about the highlights of interest to the user provided by a variety of authorized video uploaders. This allows a user to be informed about the particularly notable portions of a source. In addition, the highlight portions may be collected as to determine a "top 10" list based on factors determining the popularity or interest of the various videos. The popularity is based on the watch rates, shares, comments, and other factors. A user may also be able to select a sensitivity to highlights in order to determine whether to provide only the most interesting videos to the user or whether the user is interested in the videos that are related to the source and interesting to at least some other users. Thus, users may select the amount of updates provided to the user. A user particularly interested in the source may elect to be frequently notified by new videos, while a user interested only in the best videos associated with the source may elect to be infrequently notified only by highly popular videos.

As an example of source subscriptions, a user viewing "top 10 plays by Andrew Luck at Stanford" may choose to subscribe to the top 10 list itself, subscribe to Andrew Luck, subscribe to Stanford, or subscribe to a combination of these, such as Andrew Luck and Stanford. Subscribing to each may allow a user to select a particular set of years, or a particular source of sports coverage. For example, a combined subscription of "Andrew Luck" and "Stanford" limits videos in the subscription to videos associated with "Andrew Luck" and "Stanford," which can include videos while he was at Stanford and videos of Andrew playing in the NFL where announces compare plays to a famous game where he was a quarterback at Stanford.

The source identification may also be used to adjust the thumbnail view shown to a user when browsing videos. For example, a user may have viewed a first portion of a video that is associated with source content already viewed by the user. The video may include a second portion that has not been viewed by the user. Since the user has already viewed the first portion, the second portion of the video is used to select a thumbnail for the user so the user can identify portions of the video that may be of interest to the user. This second portion may be provided to the user even if the first portion is the portion more frequently viewed by other users. Thus the thumbnail is adjusted according to the portions of the source that have already been seen, even if a user has not watched this particular video before.

A user may be subscribed to many sources and types of content but be interested in content from a source only if it is particularly popular. The user may subscribe to the source and set the subscription to notify the user only when a video meets a high popularity threshold.

A content owner may use the source identification of videos in order to monetize an existing content library. For example, the content owner may provide the content library as a set of source videos. The content owner may provide annotations to the source library in the form of metadata to allow the system to provide subscriptions using the metadata. Using the subscriptions, additional users may view videos that use the sources owned by the content owner, and revenue derived from viewing the videos, such as advertisements, may be shared with the content owner.

Using the uploader view 520, a user is able to view additional commentary for a particular source. For example, a user may have seen the particular clip of Michael Jordan making a game winning shot, but want to view various commentary on the shot from different news broadcasts. Using the uploader view 520, additional videos that include the same source content can be shown including the various news broadcasts that include the game winning shot. The views shown in the uploader view 520 may show thumbnails of the different sources. Using the source view 500, the user may view portions of the game before and after the game winning shot, such as the play before the shot as well as the after-shot celebration and a post-game conference. When performing a search, the primary search result may be shown that includes other sources as well as a video available to watch videos that show the common parts of the video among multiple sources as well as a timeline indicating overlap between the sources. In addition, timelines may be shown that indicate where there is not overlap between the sources.

The present disclosure has been described in particular detail with respect to one or more embodiments. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A computer-implemented method for identifying video sources, the method comprising:
   identifying, by a computer, a plurality of source videos for a first video in a database of videos, each of the source videos including a first set of sequential frames present in the first video and a second set of sequential frames not present in the first video, the identifying comprising:
      comparing a fingerprint representing at least some of the first set of sequential frames of the first video to a plurality of source fingerprints of potential source videos in the database including the source videos, and
      identifying a potential source video as a source video responsive to determining that the fingerprint representing at least some of the first set of sequential frames of the first video matches a source fingerprint of the potential source video;
   ranking the source videos in an order determined based at least in part on quality scores of the source videos;
   selecting a highest ranked source video as a primary source video for the first video;

identifying, by the computer, a second video in the database of videos, the second video including the second set of sequential frames present in the primary source video and not present in the first video;

receiving, by the computer from a user device, a request to view the first video; and providing, by the computer, the second video to the user device for display.

2. The method of claim 1 further comprising providing the first video to the user device.

3. The computer-implemented method of claim 1, further comprising receiving, from the user device, a request to subscribe to the primary source video, and wherein the identified second video is recommended to the user device after the request to subscribe is received.

4. The computer-implemented method of claim 1, wherein the second set of sequential frames is chronologically prior to the first set of sequential frames in the source video.

5. The computer-implemented method of claim 1, wherein the second set of sequential frames is chronologically subsequent to the second set of sequential frames in the source video.

6. The computer-implemented method of claim 1, wherein the primary source video is associated with source video metadata, wherein the recommended second video is identified based on a similarity between metadata associated with the second video and the source video metadata.

7. The computer-implemented method of claim 6, wherein the metadata associated with the second video includes a measure of the popularity of the second video.

8. The computer-implemented method of claim 6, wherein the metadata associated with the second video includes a measure of the quality of the second video.

9. The computer-implemented method of claim 6, wherein the metadata includes data reflecting user interest in the second video.

10. The computer-implemented method of claim 9, wherein the user interest indicates at least one video highlight of the second video.

11. The computer-implemented method of claim 1, wherein the second video includes sequential frames associated with the primary source video that have been viewed by a user associated with the user device and sequential frames associated with the primary source video that have not been viewed by the user associated with the user device, and wherein the recommendation includes a thumbnail of the second video comprising a frame selected from the sequential frames that have not been viewed by the user.

12. A computer program product for identifying video sources, the computer program product stored on a non-transitory computer-readable medium and including program code configured to cause a processor to execute the steps of:

identifying, by a computer, a plurality of source videos for a first video, each of the source videos including a first set of sequential frames present in the first video and a second set of sequential frames not present in the first video, the identifying comprising:

comparing a fingerprint representing at least some of the first set of sequential frames of the first video to a plurality of source fingerprints of potential source videos in the database including the source videos, and identifying a potential source video as a source video responsive to determining that the fingerprint representing at least some of the first set of sequential frames of the first video matches a source fingerprint of the potential source video;

ranking the source videos in an order determined based at least in part on quality scores of the source videos;

selecting a highest ranked source video of the source videos as a first source video for the first video;

identifying, by the computer, a second source video based on metadata associated with the second source video and metadata associated with the first source video;

identifying, by the computer, a second video in the database of videos, the second video including a second set of sequential frames present in the second source video;

receiving, by the computer, from a user device, a request to view the first video; and providing, by the computer, the second video to the user device for display.

13. The computer program product of claim 12, wherein the metadata associated with the first source video and the metadata associated with the second source video include geographic information; and wherein the identification of the second source video is based on the geographic information in the first source video and the second source video.

14. The computer program product of claim 12, wherein the metadata associated with the first source video and the metadata associated with the second source video include event information; and wherein the identification of the second source video is based on the event information in the first source video and the second source video.

15. A computer-implemented method comprising:

receiving on a client device a request to view a first video, the first video having a first set of sequential frames included in a primary source video, the primary source video being included in a plurality source videos, each of the source videos including the first set of sequential frames and a second set of sequential frames not present in the first video and being identified from a database of videos, wherein the primary source video for the first video is identified by:

comparing a fingerprint representing at least some of the first set of sequential frames of the first video to a plurality of source fingerprints of potential source videos in the database including the source videos, and identifying a potential source video as a source video responsive to determining that the fingerprint representing at least some of the first set of sequential frames of the first video matches a source fingerprint of the potential source video;

ranking the source videos in an order determined based at least in part on quality scores of the source videos; and selecting a highest ranked source video of the source videos as a primary source video for the first video;

displaying on the client device the first video; and displaying on the client device a recommendation for a second video, the second video having the second set of sequential frames included in the primary source video but not included in the first video.

16. The method of claim 15, further comprising:

displaying an indicator indicating that the first video includes content from the primary source video.

17. The method of claim 15, further comprising:

displaying an indicator indicating content in the first video that is not included in the primary source video.

18. The method of claim 15, wherein the recommendation is displayed responsive to the first set of sequential frames being displayed.

19. The method of claim 15, wherein the second set of sequential frames are displayed subsequent to the first set of sequential frames in the source video.

20. The method of claim 15, wherein the second set of sequential frames are displayed immediately prior to the first set of sequential frames in the source video.

21. A computer-implemented method comprising:
receiving on a client device a request to view a first video, the first video having a first set of sequential frames included in a first source video being included in a plurality of source videos, each of the source videos including the first set of sequential frames and a second set of sequential frames not present in the first video and being identified from a database of videos by:
comparing a fingerprint representing at least some of the first set of sequential frames of the first video to a plurality of source fingerprints of potential source videos in the database including the source videos, and
identifying a potential source video as a source video responsive to determining that the fingerprint representing at least some of the first set of sequential frames of the first video matches a source fingerprint of the potential source video;
ranking the source videos in an order determined based at least in part on quality scores of the source videos;
selecting a highest ranked source video of the source videos as the first source video for the first video;
displaying on the client device the first video; and
displaying on the client device a recommendation for a second video, the second video having a second set of sequential frames included in a second source video related to the first source video.

22. The method of claim 1, wherein comparing at least one unique representation representing at least some of the first set of sequential frames of the first video to a plurality of unique representations of the videos in the database comprises:
calculating the plurality of source fingerprints based on series of sequential frames of potential source videos in the database; and
calculating the fingerprint representing at least some of the first set of sequential frames of the first video.

\* \* \* \* \*